United States Patent

Vogel et al.

Patent Number: 5,552,680
Date of Patent: Sep. 3, 1996

[54] DEVICE FOR OPERATING A GAS-DISCHARGE LAMP

[75] Inventors: Manfred Vogel, Ditzingen-Heimerdingen; Ulrich Drews, Vaihingen/Pulverdingen; Werner Herden, Gerlingen; Johann Konrad; Albert Gerhard, both of Tamm, all of Germany

[73] Assignee: Robert Bosch GmbH, Stuttgart, Germany

[21] Appl. No.: 146,175

[22] PCT Filed: May 23, 1992

[86] PCT No.: PCT/DE92/00422

§ 371 Date: Nov. 12, 1993

§ 102(e) Date: Nov. 12, 1993

[87] PCT Pub. No.: WO92/22182

PCT Pub. Date: Dec. 10, 1992

[30] Foreign Application Priority Data

Jun. 1, 1991 [DE] Germany .................. 41 18 077.1

[51] Int. Cl.⁶ ................................................ H05B 37/02
[52] U.S. Cl. ........................ 315/291; 315/127; 315/307
[58] Field of Search .............................. 315/289, 299, 315/290, 209 R, 225, 127, 307, 291, 308

[56] References Cited

U.S. PATENT DOCUMENTS 4,286,193  8/1981  King, Jr. et al. .................. 315/289

Primary Examiner—Robert J. Pascal
Assistant Examiner—Michael B. Shingleton
Attorney, Agent, or Firm—Spencer & Frank

[57] ABSTRACT

A device for operating a gas-discharge lamp includes a starting member and a power member for supplying energy to the lamp. A switch is arranged between the lamp and the power member and connects the power member with the lamp subsequent to the initiation of the starting process.

12 Claims, 2 Drawing Sheets

DEVICE FOR OPERATING A GAS-DISCHARGE LAMP

BACKGROUND OF THE INVENTION

The invention is based on a device for operating a gas-discharge lamp as defined in the main claim. This type of, the device, including a starting member connected to the lamp and a power member for the power supply of the lamp. Such a device is known from the technical publication, "Lamps and Lighting," Thorn EMI Lighting Ltd., Edward Arnold Publisher, London, 1983, P. 334. The power member is configured as a ballast having a choke and is connected to the current supply. The pulses for the starting voltage occurring directly at the lamp react with the power member. The choke present in the ballast draws a portion of the starting power provided by the starting member. This energy must additionally be made available by the starting member.

SUMMARY OF THE INVENTION

It is the object of the invention to reduce the reactions of the starting pulse emitted by the starting member to the power member.

This object and other objects are attained by a device of the type first mentioned above wherein there is further included a switch connected between the power member and the lamp and responsive to a starting of the lamp for connecting the power member with the lamp.

The switch arranged according to the invention between the lamp and the power member separates the power member from the lamp at least at the initiation of the starting process during which high peak values of the starting pulse voltage occur. The switch does not connect the power member with the lamp until after the starting process has been initiated. This measure effectively prevents reactions which the starting pulse could produce in the power member. It is especially advantageous that the starting energy made available by the starting member can be supplied entirely to the lamp.

Various advantageous modifications and improvements of the device are possible within the scope of the invention.

The switch may be realized, for example, as an electrically activatable switch.

An optically activatable switch in which a galvanic separation exists between the switch and its activator, is especially suitable. The activation of the switch is especially easy if the radiation emitted by the lamp is used for operating the switch after the initiation of the starting process. The radiation may be guided, for example, by way of a light waveguide, which may be dispensed with, however, if the switch is aligned properly in relation to the lamp,—such that the radiation of the lamp reaches the switch directly.

A further advantageous modification provides means for detecting the initiated starting process. Each of these means emit an activation signal to an electrically activatable switch.

The means provided may comprise, for example, a device for detecting the voltage applied to the lamp or the speed of voltage variation, a sensor for detecting the current flowing through the lamp, or a sensor for detecting the radiation emitted by the lamp.

In an advantageous modification of the device according to the invention an optically activatable breakover diode is provided as a switch.

The device according to the invention is especially suitable for operating high-pressure gas-discharge lamps, because these lamps require especially high starting voltages compared to the subsequent burning voltage during continuous operation.

Further advantageous modifications of the device according to the invention will become apparent from the following detailed description taken in conjunction with the accompanying drawings.

DETAILED DESCRIPTION OF THE PREFERRED EMBODIMENTS

Figure 1:
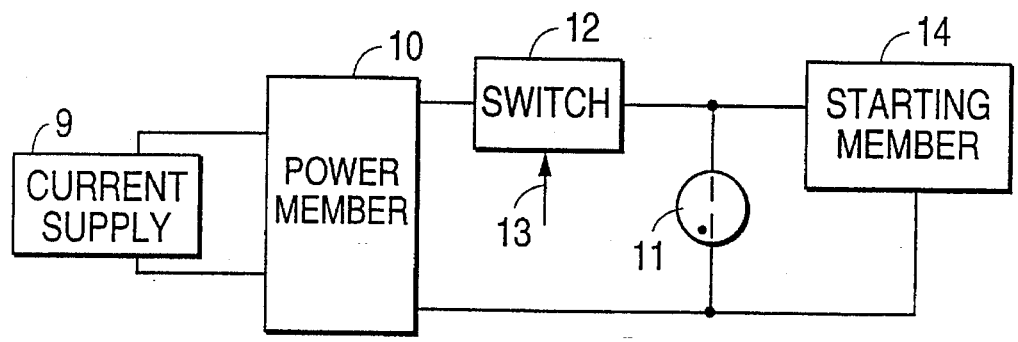
FIG. 1 shows a block circuit diagram of a device according to the invention.

In FIG. 1 a power member 10 is provided for the power supply of a gas-discharge lamp 11. Power member 10, which may be a ballast having a choke is connected to a current supply 9. A switch 12, to which an input signal 13 can be supplied, is arranged between lamp 11 and power member 10. A starting member 14 is connected to lamp 11.

The function of switch 12 arranged between the power member 10 and lamp 11 is to separate power member 10 from lamp 11 at least during the start of lamp 11. After the initiation of the starting process in lamp 11, switch 12 connects lamp 11 with power member 10. As switch 12 closes, power member 10 takes over the energy supply for lamp 11. By this measure, the starting voltage pulse, which is high in relation to the burning voltage of the lamp 11, is kept away from power member 10. Thus power member 10 need not be designed to resist the high pulse voltages. The complete separation of the remaining circuit components from lamp 11 during the start makes it possible to supply lamp 11 with the total energy made available by starting member 14. This is especially advantageous, if a high-pressure gas-discharge lamp is to be started which, by comparison with the burning voltage, has a very high starting voltage requirement.

Depending on the special type of switch chosen, an input signal 13 for switching on switch 12 is required. However, no special input signal is required in a preferred embodiment.

Figure 2:
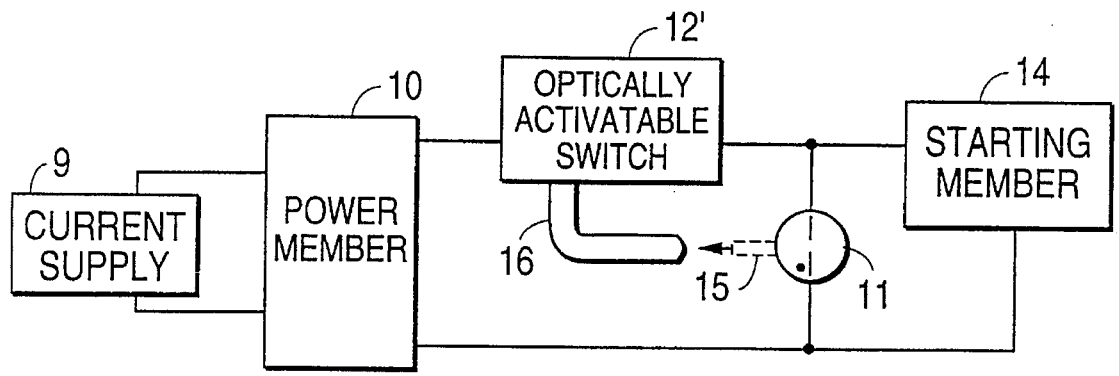
FIGS. 2–5 are block circuit diagrams of further embodiments of a device according to the invention.

This embodiment is shown in FIG. 2. The switch there is configured as an optically activatable switch 12'. The radiation 15 emitted from the lamp 11 and occurring after the initiation of the starting process, is also the input signal of switch 12'. If the switch 12' is designed properly with respect to lamp 11, no additional means are required to guide the radiation. If a spatial separation is provided between switch 12' and lamp 11, radiation 15 may be supplied to the switch 12' by means of an optical component 16. The optical component 16 is advantageously configured as a light waveguide.

Figure 3:
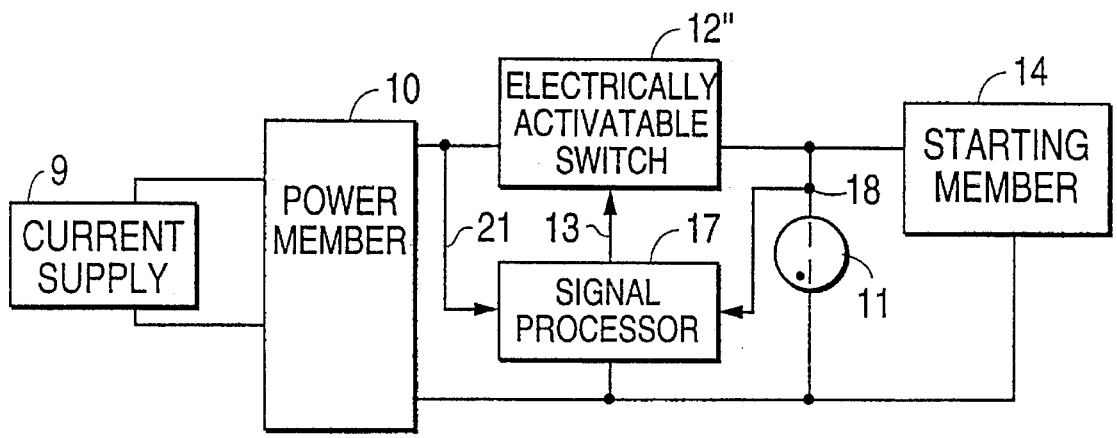

An electrically activatable switch 12 is also suitable as the switch as shown in FIG. 3.

Figure 4:
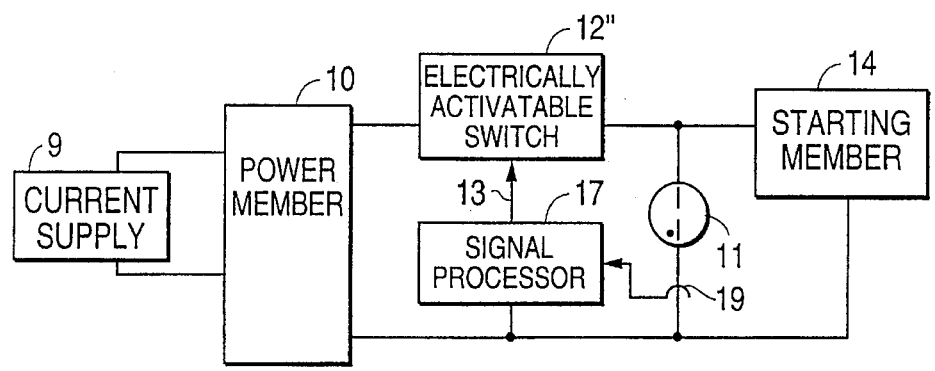

FIG. 3 shows an embodiment of the device according to the invention including an electrical switch 12. The components shown in FIG. 3, which correspond to the components shown in FIGS. 1 and 2, bear the same reference numerals in FIG. 3 as in FIGS. 1 and 2. The electrical input signal 13 of switch 12' is made available by a signal processor 17. The signal processor 17 interacts with means that detect the initiation of the starting process of lamp 11. These means are, for example, a voltage detection device 18 which detects voltage occurring at lamp 11. Subsequent to the initiation of the starting process, the starting voltage breaks down to a voltage which is low compared to the peak value. Switch 12' is turned on as the result of a comparison of the voltage occurring at the lamp with a threshold value in signal processor 11. Instead of measuring the voltage, it is preferably also possible to determine the speed of voltage variation and to compare it with a threshold value in signal processor 17. A high speed variation value within the range of a voltage decrease indicates the break-down and therefore the starting of lamp 11. Detection of the starting process is also possible as shown in FIG. 4 by means 19 for detecting the current flowing through lamp 11. The current sensor 19 may also be realized, for example, as a Rogowski coil or as a shunt resistor. As soon as current flows through lamp 11, the starting process begins. Switch 12' is switched on as a result of a comparison of the current with a threshold value in signal processor 17.

Figure 5:
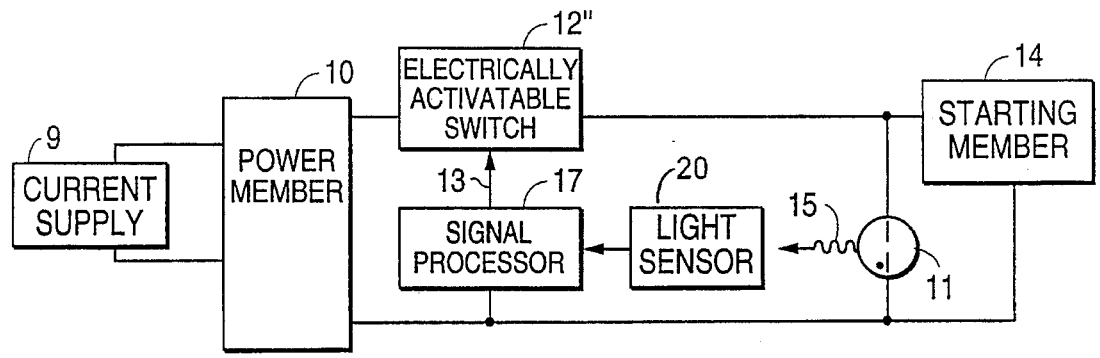

Another embodiment for the detection of the starting process is shown in FIG. 5, wherein a sensor 20 is provided to detect the radiation 15 emitted by lamp 11. A soon as lamp 11 emits radiation, the starting process begins. Switch 12' is switched on as a result of a comparison of the signal emitted by the light sensor 20 with a threshold value.

The indicated means 18, 19, 20 as well as each of the evaluation methods indicated may be provided individually or in any desired combination.

The switch is preferably configured as a semiconductor component. Especially suitable for switching on is an optically activatable switches 12' which utilizes the radiation 15 emitted by lamp 11 (FIG. 2). Especially advantageous is an optically activatable break-over diode which is particularly inexpensive, but which, nevertheless, has the required characteristics with respect to electric strength, strength with respect to high-speed voltage variations, and low internal resistance in the switched-on state. If switches having a thyristor characteristic such as, for example, break-over diodes are used, the block circuit diagram in FIG. 3 of the device according the invention may be complemented by an additional activation unit 21 for signal processor 17, because, depending on the configuration of the switch 12', a transition into the off-state may occur during zero current passages. These zero passages occur if lamp 11 is supplied with alternating current. The additional activation unit 21, in the simplest case, is a connecting line which connects the signal processor 17 with the output of power member 10. Power member 10 can divert an input signal 13 to switch 12' from the current occurring at this unit or from the voltage occurring there during each period of the alternating current. As an alternative to a further activation unit 21, the frequency of the power member 10 may be chosen in such a way that the thyristors or breakover diodes remain conductive after their recovery time. If an optically activated switch is used as in FIG. 2 which is activated directly by the emitted radiation 15 of lamp 11, means are not required for periodically switching on the switch after each zero passage of the current, because the radiation 15 emitted by lamp 11 does not drop to the zero value or to the vicinity of zero while the lamp is in operation so that during each period radiation 15 ensures the required input signal for switching switch 12 on again.

The starting member 14 may be configured in such a way that it emits not only one starting pulse but a sequence of starting pulses. In this case too, the switch ensures a separation between power member 10 and lamp 11, because the switch 12, 12', 12' is still blocked during the starting process which is triggered by one of the starting pulses. Those starting pulses which might still occur after the initiation of the starting process, produce only low amplitudes at lamp 11.

We claim:

1. A device for operating a gas-discharge lamp, the device including a starting member connected to the lamp for providing a starting voltage pulse to the lamp during a starting process, and a power member for supplying energy to the lamp after a starting of the lamp, the improvement comprising a switch connected between the power member and the lamp, said switch being open at least during initiation of the starting process thereby disconnecting the power member from the lamp, and being responsive to a starting of the lamp for connecting the power member with the lamp.

2. A device according to claim 1, further comprising means for detecting the starting process coupled to said switch for closing the switch in response to the starting of the lamp.

3. A device according to claim 2, wherein said means includes means for detecting a voltage occurring at the lamp.

4. A device according to claim 2, wherein said means comprises means for detecting a current flowing through the lamp.

5. A device according to claim 2, wherein said means comprises a radiation sensor for detecting radiation emitted by the lamp.

6. A device according to claim 1 wherein said switch comprises an electrically activatable switch.

7. A device according to claim 1, wherein said switch comprises an optically activatable switch.

8. A device according to claim 7, further comprising an optical component arranged for supplying radiation of the lamp to the optically activatable switch.

9. A device according to claim 1, wherein said switch comprises an optically triggerable break-over diode.

10. A device according to claim 1, wherein the power member has a frequency selected so that subsequent to connecting the power member with the lamp, the switch remains conductive without additional activating pulses.

11. A device according to claim 7, wherein said optical component comprises a light waveguide.

12. A device according to claim 2, wherein said means includes means for detecting a speed of voltage variation at the lamp.

\* \* \* \* \*